(12) United States Patent
Magarill et al.

(10) Patent No.: US 7,085,063 B2
(45) Date of Patent: Aug. 1, 2006

(54) MULTI-DIRECTIONAL OPTICAL ELEMENT AND AN OPTICAL SYSTEM UTILIZING THE MULTI-DIRECTIONAL OPTICAL ELEMENT

(75) Inventors: Simon Magarill, Cincinnati, OH (US); Todd S. Rutherford, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 11 days.

(21) Appl. No.: 10/845,674

(22) Filed: May 14, 2004

(65) Prior Publication Data

US 2005/0254131 A1    Nov. 17, 2005

(51) Int. Cl.
*G02B 27/01* (2006.01)

(52) U.S. Cl. .............. 359/634; 359/721; 353/102; 348/757; 348/780

(58) Field of Classification Search ............ 359/618, 359/721, 634; 353/102; 348/781, 757, 780
See application file for complete search history.

(56) References Cited

U.S. PATENT DOCUMENTS

| | | | |
|---|---|---|---|
| 5,098,183 A | | 3/1992 | Sonehara |
| 5,355,187 A | * | 10/1994 | Ogino et al. ............... 353/38 |
| 5,515,206 A | * | 5/1996 | Peng ......................... 359/721 |
| 5,694,256 A | | 12/1997 | Winkler |
| 5,784,209 A | * | 7/1998 | Manabe .................... 359/720 |
| 5,864,374 A | * | 1/1999 | Ito et al. ................... 348/757 |
| 6,671,099 B1 | | 12/2003 | Nagata |
| 6,717,736 B1 | * | 4/2004 | Hill .......................... 359/629 |

FOREIGN PATENT DOCUMENTS

| | | |
|---|---|---|
| DE | 362 482 | 10/1922 |
| EP | 0 302 737 | 2/1989 |
| FR | 775 060 | 12/1934 |

* cited by examiner

*Primary Examiner*—Hung X. Dang
*Assistant Examiner*—Joseph Martinez
(74) *Attorney, Agent, or Firm*—Anna A. Kobilansky; George W. Jonas

(57) ABSTRACT

Multi-directional optical elements are disclosed that include a body having a first side having a first curvature, a second side having a second curvature, a third side having a third curvature, and a fourth side having a fourth curvature. The second side is disposed generally opposite the first side along a first direction and a fourth side is disposed generally opposite the third side along a second direction, the second direction being different from the first direction. Also disclosed are optical systems utilizing such multi-directional optical elements.

29 Claims, 1 Drawing Sheet

MULTI-DIRECTIONAL OPTICAL ELEMENT AND AN OPTICAL SYSTEM UTILIZING THE MULTI-DIRECTIONAL OPTICAL ELEMENT

FIELD OF THE INVENTION

The present disclosure relates to refractive optical elements, and, more specifically, the present disclosure relates to multi-directional optical elements capable of refracting light in at least two different directions, which may be used in microdisplay projection systems. The present disclosure is also directed to optical systems including such multi-directional optical elements.

BACKGROUND

Optical systems are widespread and often include a light source or sources and a system of optical elements. In some optical systems, a light beam originating from a light source or an assembly of light sources may be split into two or more beams traveling in different directions, which may or may not be recombined further downstream. In other types of optical systems, light beams originating from different light sources or light source assemblies may initially travel in different directions, and also may or may not be recombined further downstream. Such multi-directional optical systems are usually relatively complex and include large numbers of various optical elements, such as refractive, reflective and diffractive optical elements. Folding mirrors are commonly used to fold the optical paths and thus reduce the footprints of large complicated optical systems.

SUMMARY

The present disclosure is directed to multi-directional optical elements including a body having a first side with a first curvature, a second side with a second curvature, a third side with a third curvature, and a fourth side with a fourth curvature. The second side is disposed generally opposite the first side along a first direction, and the fourth side is disposed generally opposite the third side along a second direction, the second direction being different from the first direction.

The present disclosure is also directed to optical systems including a first illumination channel including a first light source, a first illumination target, and a multi-directional optical element. The multi-directional element includes a body having a first side with a first curvature, a second side with a second curvature disposed generally opposite the first side along a first direction, a third side with a third curvature, and a fourth side with a fourth curvature disposed generally opposite the third side along a second direction. The multi-directional optical element is disposed between the first light source and the first illumination target, so that light of the first channel travels through the multi-directional optical element generally in the first direction. Such optical systems further include a second illumination channel comprising a second light source, a second illumination target, and the multi-directional optical element. The multi-directional optical element is disposed between the second light source and the second illumination target, so that light of the second channel travels through the multi-directional optical element generally in the second direction that is different from the first direction.

These and other aspects of the multi-directional optical elements of the subject invention and of the optical systems including such multi-directional optical elements will become readily apparent to those of ordinary skill in the art from the following detailed description together with the drawings.

BRIEF DESCRIPTION OF THE DRAWINGS

So that those of ordinary skill in the art to which the subject invention pertains will more readily understand how to make and use the subject invention, exemplary embodiments thereof will be described in detail below with reference to the drawings, wherein.

DETAILED DESCRIPTION

Exemplary embodiments of the present disclosure are suitable for use in multi-directional optical systems, in which light travels along two or more directions, such as microdisplay projectors. One such system is described in a commonly owned and concurrently filed Magarill et al. U.S. patent application entitled "Illumination Systems With Separate Optical Paths for Different Color Channels," Attorney Docket No. 59637US002, the disclosure of which is hereby incorporated by reference herein to the extent it is not inconsistent with the present disclosure.

Figure 1A:
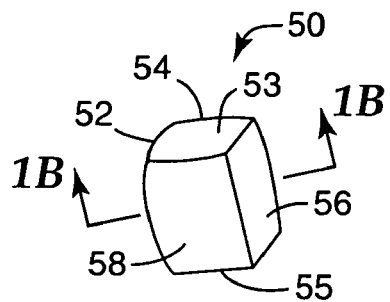
FIG. 1A shows schematically a perspective view of an exemplary multi-directional optical element constructed according to the present disclosure.
Figure 1B:
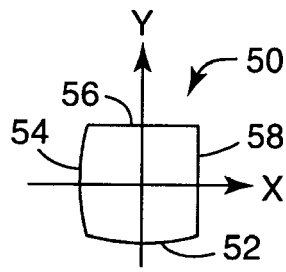
FIG. 1B shows schematically a cross-sectional view of the multi-directional optical element shown in FIG. 1A.

FIGS. 1A and 1B show schematically an exemplary multi-directional optical element 50, constructed in accordance with the present disclosure. A schematic perspective view of the multi-directional optical element 50 is shown in FIG. 1A. FIG. 1B represents a schematic cross-sectional view, with the cross-section taken as shown in FIG. 1A. This exemplary multi-directional optical element has sides 52 and 56 disposed generally opposite to each other along a first direction, and it has sides 54 and 58 also disposed generally opposite to each other along a second direction. In some exemplary embodiments, the side 52 may be adjacent to the side 54, and the side 56 may be adjacent to the side 58. The sides 52 and 54 may have a first radius of curvature, and the sides 56 and 58 may have a second radius of curvature. Alternatively, the sides 52 and 54 can have different radii of curvature, and so can the sides 56 and 58. Depending on the application, in some embodiments of the present disclosure, the multi-directional element 50 can include additional surfaces (not shown), for example, forming an approximately hexagonal, octagonal, or a different multi-sided cross-section instead of a four-sided cross-section shown in FIG. 1B. In such exemplary embodiments, the additional sides may be curved or flat and may include mounting surface structures, such as depressions, protrusions or both, in order to facilitate mounting of such multi-directional optical elements.

Referring further to FIG. 1A, the exemplary multi-directional optical element 50 further includes two sides 53 and 55, disposed generally opposite to each other. The opposing surfaces 53 and 55 can be substantially planar, or they may be curved, depending on the application. In some embodiments of the present disclosure, the opposing sides 53 and 55 can include surface structures to facilitate mounting, such as depressions and/or protrusions. In the appropriate exemplary embodiments, the curvatures of any one or more surfaces can be aspherical, as it may be desirable for a particular application. Similarly, any one or more surfaces can include microstructures, such as diffractive structures known to those of ordinary skill in the art.

Figure 2:
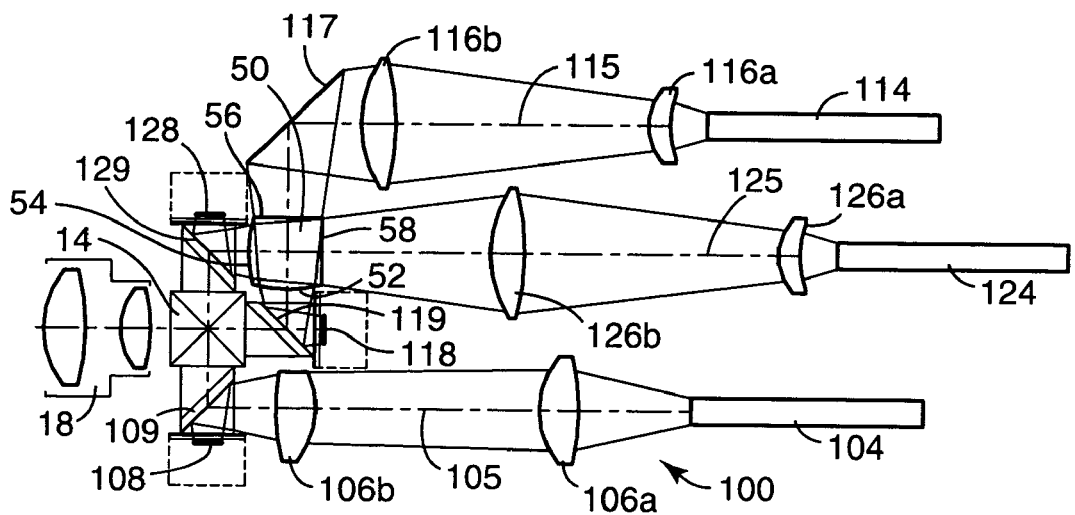
FIG. 2 shows schematically a portion of an exemplary 3-panel projection system incorporating an exemplary multi-directional optical element constructed according to the present disclosure.

With reference to FIG. 2, in the exemplary multi-directional element 50 shown, the sides 52 and 54 are convex, while the sides 56 and 58 are concave. In some embodiments, the multi-directional optical element 50 is configured so that light incident onto either one of the surfaces 56 or 58 and emerging from the opposing surface 52 or 54 travels along substantially equivalent optical paths in two different general directions and is refracted in substantially the same manner. Preferably, the two directions make an angle of about 90 degrees with respect to each other, as illustrated by the axes X and Y in FIG. 1B, but other angles between the two directions are also within the scope of the present disclosure, as may be useful for a particular system configuration, especially if the multi-directional element has more than four sides across a single cross-section. In some embodiments of the present disclosure, light may also travel through the multi-directional element 50 along a third direction, such as from the side 53 to the side 55 or vice versa. Alternatively, the sides 53 and 55 can be used for mounting the multi-directional optical element.

FIG. 2 shows schematically a portion of a 3-panel projection system 100 incorporating a multi-directional optical element 50 constructed according to the present disclosure. Such projection systems can be used with reflective image-forming devices, such as Liquid Crystal on Silicon (LCoS), and in which at least a portion of the optical path for each color channel (here, red, green and blue) is not shared with other color channels. In particular, the exemplary projection system 100 includes channels corresponding to different primary colors, such as a red color channel 105, a green color channel 115 and a blue color channel 125. Illumination systems utilizing light sources and channels of other colors, as suitable for a particular application, are also within the scope of the present disclosure.

The red color channel 105 includes: a red light source or sources (not shown), such as red LEDs; an integrator 104; relay optics, such as relay lenses 106a and 106b; a polarizing beam splitter 109; and an illumination target 108, such as an image-forming device. The green color channel 115 includes: a green light source or sources (not shown), such as green LEDs; an integrator 114; relay optics, such as lenses 116a and 116b; a fold mirror 117; a polarizing beam splitter 119; and an illumination target 118, such as an image-forming device. The blue color channel 125, in turn, includes: a blue light source or sources (not shown), such as blue LEDs; an integrator 124; relay optics, such as lenses 126a and 126b; a polarizing beam splitter 129; and an illumination target 128, such as an image-forming device. Light modulated by the red, green and blue image-forming devices 108, 118 and 128 may be combined using a cross dichroic combiner 14. The combined modulated red, green and blue beams are then collected by the projection optics 18 for delivery to a screen (not shown) or to another optical element or device for further processing.

Both the green channel 115 and the blue channel 125 include the multi-directional optical element 50, disposed at an intersection of the green and blue beams. In the exemplary projection system shown in FIG. 2, green illumination beam exiting the relay lens 116b and reflected by the fold mirror 117 enters the side 56 of the multi-directional optical element 50 and exits it through the side 52 in a first general direction, shown by the optical axis of the green illumination. Blue illumination beam exiting the relay lens 126b of the same exemplary embodiments enters the multi-directional optical element 50 through the side 58 and exits it through the side 54 in a second general direction, shown by the optical axis of the blue illumination. Other exemplary embodiments may include an additional illumination channel, such that illumination would travel through the multi-directional optical element from the side 53 to the side 55 or vice versa, the principal ray of the illumination showing a third general direction. In such exemplary embodiments, additional sides preferably would be added for mounting.

Because illumination from different channels can travel through the multi-directional element along different general directions, the element 50 can be preferentially constructed along those directions for the particular colors of such channels. In the context of the present disclosure, the term "preferentially constructed" encompasses any feature of the optical element this term refers to that would improve the performance, such as transmission or aberration correction, of a particular color channel to at least some degree. More specifically, an optical element is preferentially constructed for the color of its illumination channel where that channel's performance would decrease if such element were constructed as a corresponding element, if any, of another illumination channel. For example, the element 50 may include color-specific coatings, such as green anti-reflection coatings on at least one of the sides 56 and 52 and blue anti-reflection coatings on at least one of the sides 54 and 58. In some embodiments of the present disclosure, curvature of at least one of the sides 52 and 54, as well as curvature of at least one of the sides 56 and 58, can be different for different colors to reduce color aberrations more effectively. Thus, the four-sided optical element 50 can minimize vignetting, aid in configuring a more compact system, and contribute to color-specific optimization of the illumination channels.

Modeled exemplary illumination systems, which may be constructed according to the present disclosure based on FIG. 2, with red, green and blue color channels, can have the following parameters. All integrators of this exemplary embodiment have the same geometry: about 6.1×6.1 mm entrance end, about 50.0 mm length, and about 6.1×10.7 mm exit end. Integrators for different color channels are manufactured with different color-specific coatings so that their transmission is enhanced for a particular color or cost is reduced. Additional fold mirrors can be inserted into the blue channel between the relay lens 126b and the multi-directional element 50 and into the red channel between the relay lenses 106a and 106b. Other parameters of the exemplary modeled systems are shown in Tables 1–5 for the green, blue and red channels.

TABLE 1

Green channel

| Surface | | Radius (mm) | Distance to the Next Surface (mm) | Material | Clear Aperture (mm) | Conic Constant |
|---|---|---|---|---|---|---|
| Integrator Exit End 114 | | | 9.25 | | 6.1 × 10.7 | |
| Relay Lens 116a | 1 | 31.062 | 6.90 | SK5 n = 1.5891 | 22.0 | |
| | 2 | 18.818 | 62.73 | | 24.6 | |
| Relay Lens 116b | 3 | −59.84 | 14.31 | Acrylic n = 1.4917 | 40.0 | −3.9032 |
| | 4 | 39.703 | 45.00 | | 41.0 | |
| Mirror | 5 | | 33.38 | | 50 × 30 | |
| Multi-Directional Element | 6 | 603.87 | 23.36 | Acrylic n = 1.4917 | 23.36 × 23.36 (from the vertex) × 27 (height) | |
| | 7 | 40 | 4.5 | | | |

TABLE 2

Aspherical coefficients of an exemplary relay lens 116b

| | D | E | F | G | H |
|---|---|---|---|---|---|
| 3 | 2.419263E-6 | 3.834464E-9 | −3.443946E-14 | −2.223959E-14 | 2.932641E-17 |

TABLE 3

Blue channel

| Surface | | Radius (mm) | Distance to the Next Surface (mm) | Material | Clear Aperture (mm) | Conic Constant |
|---|---|---|---|---|---|---|
| Integrator Exit End 124 | | | 9.06 | | 6.1 × 10.7 | |
| Relay Lens 126a | 1 | 31.062 | 6.30 | SK5 n = 1.5891 | 22.0 | |
| | 2 | 18.818 | 61.89 | | 24.6 | |
| Relay Lens 126b | 3 | −59.84 | 14.31 | Acrylic n = 1.4917 | 40.0 | −3.9032 |
| | 4 | 39.703 | 45.00 | | 41.0 | |
| Mirror | 5 | | 32.14 | | 50 × 30 | |
| Multi-Directional Element | 6 | 603.87 | 23.36 | Acrylic n = 1.4917 | 23.36 × 23.36 (from the vertex) × 27 (height) | |
| | 7 | 40 | 4.5 | | | |

TABLE 4

Aspherical coefficients of an exemplary relay lens 126b

| | D | E | F | G | H |
|---|---|---|---|---|---|
| 3 | 2.419263E-6 | 3.834464E-9 | −3.443946E-14 | −2.223959E-14 | 2.932641E-17 |

TABLE 5

Red channel

| | Surface | Radius (mm) | Distance to the Next Surface (mm) | Material | Clear Aperture (mm) | Conic Constant |
|---|---|---|---|---|---|---|
| Integrator Exit End 104 | | | 39.78 | | 6.1 × 10.7 | |
| Relay Lens 106a | 1 | −38.556 | 14.00 | Acrylic n = 1.4917 | 35.1 | −3.1897 |
| | 2 | 29.466 | 65.00 | | 35.1 | −1.6000 |
| Mirror | 3 | | 26.72 | | 41 × 24 | |
| Relay Lens 106b | 4 | −19.059 | 11.00 | Acrylic n = 1.4917 | radius of 16 truncated on one side to 12 | −0.3957 |
| | 5 | −45.525 | 12.78 | | | |

Although the multi-directional optical elements of the present disclosure and optical systems utilizing such multi-directional optical elements have been described with reference to specific exemplary embodiments, those of ordinary skill in the art will readily appreciate that changes and modifications can be made thereto without departing from the spirit and scope of the present invention. For example, the shape, size and material of the multi-directional optical element can be different depending on the application. Furthermore, although the exemplary embodiments of the present disclosure have been described with reference to red, green and blue color channels, other types and numbers of color channels may be used in place of or in addition to the color channels described without departing from the scope of the present disclosure.

What is claimed is:

1. A multi-directional optical element comprising:
a body having a first side having a first curvature, a second side having a second curvature disposed generally opposite the first side along a first direction, a third side having a third curvature, and a fourth side having a fourth curvature disposed generally opposite the third side along a second direction different from the first direction;
wherein the body is configured such that light incident on the first side emerges from the second side and light incident on the third side emerges from the fourth side and wherein the body further comprises color-specific coatings disposed on at least one of the first, second, third and fourth sides.

2. The multi-directional optical element as recited in claim 1, wherein the first curvature is about the same as the third curvature and the second curvature is about the same as the fourth curvature.

3. The multi-directional optical element as recited in claim 1, wherein the first and third sides are convex, and wherein the second and fourth sides are concave.

4. The multi-directional optical element as recited in claim 1, wherein the first direction makes an angle of about 90 degrees with respect to the second direction.

5. The multi-directional optical element as recited in claim 1, wherein at least one of the first, second, third and fourth curvatures is preferentially constructed for illumination of a particular color.

6. The multi-directional optical element as recited in claim 1, wherein the body further comprises a fifth side and a sixth side disposed generally opposite the fifth side along a third direction different from the first and second directions.

7. The multi-directional optical element as recited in claim 6, wherein the fifth and sixth sides are substantially planar.

8. The multi-directional optical element as recited in claim 6, wherein the fifth and sixth sides include mounting surface structures.

9. The multi-directional optical element as recited in claim 6, wherein the fifth and sixth sides are curved.

10. The multi-directional optical element as recited in claim 1, wherein at least one of the sides has aspherical curvature.

11. An optical system comprising:
a first illumination channel comprising a first light source, a first illumination target, and a multi-directional optical element, which comprises a body having a first side with a first curvature, a second side with a second curvature disposed generally opposite the first side along a first direction, a third side with a third curvature, and a fourth side with a fourth curvature disposed generally opposite the third side along a second direction, said multi-directional optical element disposed between the first light source and the first illumination target so that light of the first channel travels through the multi-directional optical element generally in the first direction; and
a second illumination channel comprising a second light source, a second illumination target, and the multi-directional optical element disposed between the second light source and the second illumination target so that light of the second channel travels through the multi-directional optical element generally in the second direction that is different from the first direction.

12. The optical system as recited in claim 11, wherein the first curvature of the multi-directional optical element is about the same as the third curvature and the second curvature is about the same as the fourth curvature.

13. The optical system as recited in claim 11, wherein the first and third sides of the multi-directional element are convex, and wherein the second and fourth sides are concave.

14. The optical system as recited in claim 11, wherein the first direction makes an angle of about 90 degrees with respect to the second direction.

15. The optical system as recited in claim 11, wherein the first light source produces illumination of a first color, and wherein at least one of the first and second curvatures of the multi-directional optical element is preferentially constructed for illumination of the first color.

16. The optical system as recited in claim 15, wherein the first light source produces illumination of a first color, and wherein the multi-directional element further comprises at least one color-specific coating preferentially constructed for illumination of the first color disposed on at least one of the first and second sides.

17. The optical system as recited in claim 11, wherein the second light source produces illumination of a second color, and wherein at least one of the third and fourth curvatures of the multi-directional optical element is preferentially constructed for illumination of the second color.

18. The optical system as recited in claim 17, wherein the second light source produces illumination of a second color, and wherein the multi-directional element further comprises at least one color-specific coating preferentially constructed for illumination of the second color disposed on at least one of the third and fourth sides.

19. The optical system as recited in claim 11, further comprising a third color illumination channel comprising a third light source and a third illumination target.

20. A multi-directional optical element comprising:
a body having a first side having a first curvature, a second side having a second curvature disposed generally opposite the first side along a first direction, a third side having a third curvature, and a fourth side having a fourth curvature disposed generally opposite the third side along a second direction different from the first direction;
wherein the body is configured such that light incident on the first side emerges from the second side and light incident on the third side emerges from the fourth side and wherein at least one of the sides includes microstructures.

21. The multi-directional optical element as recited in claim 20, wherein the first curvature is about the same as the third curvature and the second curvature is about the same as the fourth curvature.

22. The multi-directional optical element as recited in claim 20, wherein the first and third sides are convex, and wherein the second and fourth sides are concave.

23. The multi-directional optical element as recited in claim 20, wherein the first direction makes an angle of about 90 degrees with respect to the second direction.

24. The multi-directional optical element as recited in claim 20, wherein at least one of the first, second, third and fourth curvatures is preferentially constructed for illumination of a particular color.

25. The multi-directional optical element as recited in claim 20, wherein the body further comprises a fifth side and a sixth side disposed generally opposite the fifth side along a third direction different from the first and second directions.

26. The multi-directional optical element as recited in claim 25, wherein the fifth and sixth sides are substantially planar.

27. The multi-directional optical element as recited in claim 25, wherein the fifth and sixth sides include mounting surface structures.

28. The multi-directional optical element as recited in claim 25, wherein the fifth and sixth sides are curved.

29. The multi-directional optical element as recited in claim 20, wherein at least one of the sides has aspherical curvature.

* * * * *